(12) United States Patent
Thomas et al.

(10) Patent No.: US 7,976,662 B2
(45) Date of Patent: Jul. 12, 2011

(54) LAMINATE CONTAINING A FLUORINATED NONWOVEN WEB

(75) Inventors: Oomman P. Thomas, Alpharetta, GA (US); David M. Jackson, Alpharetta, GA (US); James M. Carr, Kaukauna, WI (US); Thomas Vercauteren, Greenville, WI (US); Daniel Wideman, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1099 days.

(21) Appl. No.: 11/303,035

(22) Filed: Dec. 15, 2005

(65) Prior Publication Data
US 2007/0141930 A1 Jun. 21, 2007

(51) Int. Cl.
*B29C 65/00* (2006.01)
(52) U.S. Cl. ............... 156/163; 427/255.24; 427/255.39
(58) Field of Classification Search ............ 156/163, 156/164, 178; 427/255.24, 255.39
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,360,412 A * | 12/1967 | James | 156/229 |
| 3,494,821 A | 2/1970 | Evans | |
| 3,502,538 A | 3/1970 | Petersen | |
| 3,502,763 A | 3/1970 | Hartman | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 4,041,203 A | 8/1977 | Brock et al. | |
| 4,144,370 A | 3/1979 | Boulton | |
| 4,296,151 A * | 10/1981 | Boultinghouse | 427/322 |
| 4,323,534 A | 4/1982 | Des Marais | |
| 4,340,563 A | 7/1982 | Appel et al. | |
| 4,374,888 A | 2/1983 | Bornslaeger | |
| 4,663,220 A | 5/1987 | Wisneski et al. | |
| 4,766,029 A | 8/1988 | Brock et al. | |
| 4,834,738 A | 5/1989 | Kielpikowski et al. | |
| 4,965,122 A | 10/1990 | Morman | |
| 4,981,747 A | 1/1991 | Morman | |
| 4,994,308 A | 2/1991 | Tarancon | |
| 5,093,422 A | 3/1992 | Himes | |
| 5,169,706 A | 12/1992 | Collier et al. | |
| 5,213,881 A | 5/1993 | Timmons et al. | |
| 5,226,992 A | 7/1993 | Morman | |
| 5,272,236 A | 12/1993 | Lai et al. | |
| 5,278,272 A | 1/1994 | Lai et al. | |
| 5,284,703 A | 2/1994 | Everhart et al. | |

(Continued)

FOREIGN PATENT DOCUMENTS

WO     WO 0039201     7/2000

(Continued)

*Primary Examiner* — Michael A Tolin
(74) *Attorney, Agent, or Firm* — Dority & Manning, P.A.

(57) ABSTRACT

An elastic laminate that contains a nonwoven web bonded to an elastic layer is provided. The elastic layer contains one or more elastomeric polymers that are generally polar in nature, such as polyurethanes. To the contrary, the nonwoven web is formed from a material that is non-polar in nature. Nevertheless, one or more surfaces of the nonwoven web are fluorinated so that the resulting surface tension is increased. In this manner, the present inventors have discovered that, despite the difference in polarity between the layers, good attachment may be achieved without necessarily requiring an adhesive. Not only will such layers remained attached, but the functionality of the resulting laminate is also not adversely affected.

15 Claims, 1 Drawing Sheet

U.S. PATENT DOCUMENTS

| | | | |
|---|---|---|---|
| 5,304,599 A | 4/1994 | Himes | |
| 5,332,613 A | 7/1994 | Taylor et al. | |
| 5,336,545 A | 8/1994 | Morman | |
| 5,382,400 A | 1/1995 | Pike et al. | |
| 5,464,688 A | 11/1995 | Timmons et al. | |
| 5,539,056 A | 7/1996 | Yang et al. | |
| 5,596,052 A | 1/1997 | Resconi et al. | |
| 5,695,868 A | 12/1997 | McCormack | |
| 5,753,776 A | 5/1998 | Bierschenk et al. | |
| 5,849,399 A | 12/1998 | Law et al. | |
| 5,855,999 A | 1/1999 | McCormack | |
| 5,932,497 A | 8/1999 | Morman et al. | |
| 5,997,981 A | 12/1999 | McCormack et al. | |
| 6,015,764 A | 1/2000 | McCormack et al. | |
| 6,111,163 A | 8/2000 | McCormack et al. | |
| 6,207,237 B1 | 3/2001 | Haffner | |
| 6,245,401 B1 | 6/2001 | Ying et al. | |
| 6,315,864 B2 | 11/2001 | Anderson et al. | |
| 6,432,175 B1 | 8/2002 | Jones et al. | |
| 6,461,457 B1 | 10/2002 | Taylor et al. | |
| 6,787,184 B2 | 9/2004 | Snowden et al. | |
| 6,911,174 B2 | 6/2005 | Creagan | |
| 2002/0104608 A1 | 8/2002 | Welch et al. | |
| 2004/0121687 A1 | 6/2004 | Morman et al. | |
| 2004/0127128 A1 | 7/2004 | Thomas | |
| 2004/0127868 A1 | 7/2004 | Olson et al. | |
| 2004/0207125 A1 | 10/2004 | Jones et al. | |
| 2005/0124961 A1 | 6/2005 | Morman et al. | |

FOREIGN PATENT DOCUMENTS

| | | |
|---|---|---|
| WO | WO 2004020174 | 11/2004 |

\* cited by examiner

LAMINATE CONTAINING A FLUORINATED NONWOVEN WEB

BACKGROUND OF THE INVENTION

Elastomeric materials have been used in the past in countless different applications. For instance, waist bands, leg bands, feminine care products, adult care products, and diapers employ elastic components in order to supply such articles with elastic properties and a better fit. Elastic materials may be coupled with one or more other layers in order to form laminate structures in these and other applications. In some instances, it is advantageous to have a composite web, such as a laminate, that combines the properties of an elastomeric material with another material, such as a nonwoven web. However, good attachment of the elastic material with a nonwoven web may be difficult to achieve because of the differences in surface properties of the two materials. Many composite webs may delaminate and lose their function over time. For example, a sheet having a substantially non-polar surface generally does not attach well to polar surfaces, such as many elastic materials, including elastic webs. Even when an adhesive is used to attach a non-polar surface to a polar surface, delamination may easily occur because of the lack of compatibility of the two surfaces. Furthermore, a non-polar surface generally will not laminate to a polar surface without the use of an adhesive.

As such, a need currently exists for a composite web having improved attachment between the elastomeric material and the other material, such as a nonwoven web. Furthermore, a need exists for a composite web that resists delamination, while retaining its function.

SUMMARY OF THE INVENTION

In one embodiment, the present invention is generally directed to a laminate comprising a nonwoven web attached to a second layer. The surface of the nonwoven web has been fluorinated to improve the attachment of the nonwoven web to the second layer. For example, fluorinating the surface of the nonwoven web can increase the surface tension by at least about 50%. The second layer can be directly attached to the fluorinated surface of the nonwoven web, or an intermediate layer, such as an adhesive, can be present.

In one particular embodiment, the laminate can be an elastic laminate comprising a nonwoven web attached to an elastic layer, such as an elastic or non-polar elastic film. For example, the nonwoven web can be a spunbond nonwoven web comprising non-polar fibers. The surface of the nonwoven web has been fluorinated to improve the attachment of the nonwoven web to the elastic layer.

In yet another embodiment, the present invention is generally directed to a method of making a composite web. The method includes fluorinating the surface of a nonwoven web to increase the web's original surface tension by at least about 50% and attaching the fluorinated surface to an elastic layer, such as an elastic film.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying FIGURE, in which.

Figure 1:
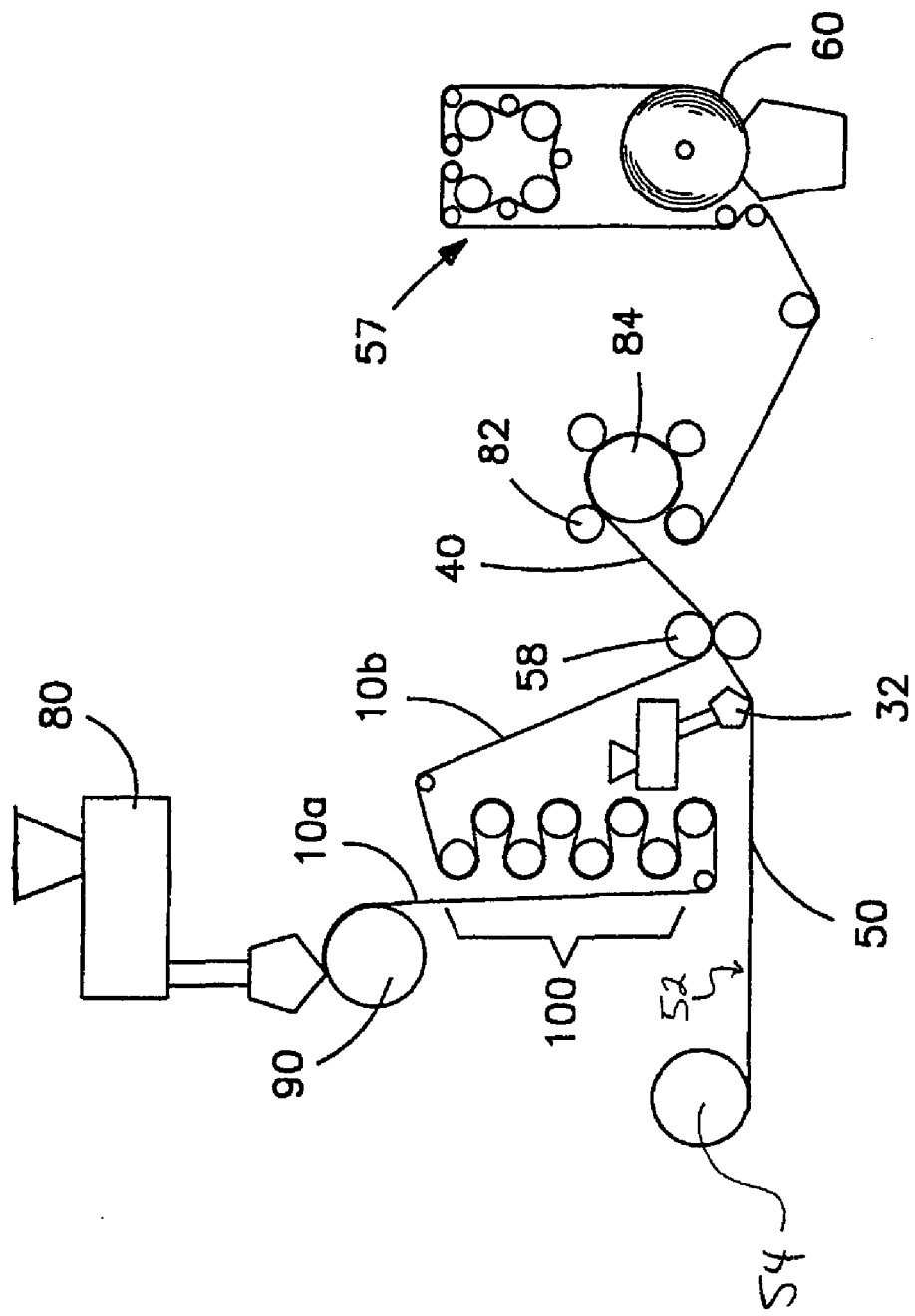
FIG. 1 schematically illustrates a method for forming a laminate according to one embodiment of the present invention.

Repeat use of reference characters in the present specification and drawings is intended to represent the same or analogous features or elements of the present invention.

DETAILED DESCRIPTION OF REPRESENTATIVE EMBODIMENTS

Definitions

As used herein the term "nonwoven fabric or web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, carded webs, etc. The basis weight of nonwoven webs may generally vary, such as from about 5 grams per square meter ("gsm") to 350 gsm, in some embodiments from about 10 gsm to about 250 gsm, and in some embodiments, from about 15 gsm to about 100 gsm.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 micrometers in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et al., 3,338,992 to Kinney, 3,341,394 to Kinney, 3,502,763 to Hartman, 3,502,538 to Peterson, 3,542,615 to Dobo, et al., and 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 micrometers, and are often between about 5 to about 20 micrometers.

As used herein the terms "extensible" or "extensibility" generally refers to a material that stretches or extends in the direction of an applied force by at least about 50% of its relaxed length or width. An extensible material does not necessarily have recovery properties. For example, an elastomeric material is an extensible material having recovery properties. A meltblown web may be extensible, but not have recovery properties, and thus, be an extensible, non-elastic material.

As used herein, the term "elastomeric" or "elastic" refers to a material that, upon application of a stretching force, is stretchable in at least one direction (such as the CD direction), and which upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a one (1) inch sample of a material that is stretchable to at least 1.50 inches and which, upon release of the stretching force, will recover to a length of not more than 1.25 inches. Desirably, such elastomeric sheet contracts or recovers at least 50%, and even more desirably, at least 80% of the stretch length in the cross machine direction.

As used herein, the terms "necked" and "necked material" generally refer to any material that has been drawn in at least one dimension (e.g., machine direction) to reduce its transverse dimension (e.g., cross-machine direction) so that when the drawing force is removed, the material may be pulled back to its original width. The necked material generally has a higher basis weight per unit area than the un-necked material. When the necked material is pulled back to its original width, it should have about the same basis weight as the un-necked material. This differs from the orientation of a film in which the film is thinned and the basis weight is reduced. The necking method typically involves unwinding a material from a supply roll and passing it through a brake nip roll assembly driven at a given linear speed. A take-up roll or nip, operating at a linear speed higher than the brake nip roll, draws the material and generates the tension needed to elongate and neck the material.

As used herein, the term "breathable" means pervious to water vapor and gases, but impermeable to liquid water. For instance, "breathable barriers" and "breathable films" allow water vapor to pass therethrough, but are substantially impervious to liquid water. The "breathability" of a material is measured in terms of water vapor transmission rate (WVTR), with higher values representing a more vapor-pervious material and lower values representing a less vapor-pervious material. Breathable materials may, for example, have a water vapor transmission rate (WVTR) of at least about 100 grams per square meter per 24 hours ($g/m^2/24$ hours), in some embodiments from about 500 to about 20,000 $g/m^2/24$ hours, and in some embodiments, from about 1,000 to about 15,000 $g/m^2/24$ hours.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations may be made in the invention without departing from the scope or spirit of the invention. For instance, features illustrated or described as one embodiment may be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present invention is directed to a nonwoven web laminated to a second layer. In order to provide improved attachment between the nonwoven web and the second layer, one or more surfaces of the nonwoven web has been fluorinated.

In one particular embodiment, the present invention is generally directed to an elastic laminate that contains a nonwoven web bonded to an elastic layer. The elastic layer contains one or more elastomeric polymers that are generally polar in nature, such as polyurethanes. To the contrary, the nonwoven web is formed from a material that is non-polar in nature. Nevertheless, one or more surfaces of the nonwoven web are fluorinated so that the resulting surface tension is increased. In this manner, the present inventors have discovered that, despite the initial difference in polarity between the layers, good attachment may be achieved without necessarily requiring an adhesive because the polarity of one layer will change after exposure to fluorination. Not only will such layers remained attached, but the functionality of the resulting laminate is also not adversely affected and can actually be improved in terms of the laminate strength, softness, flexibility and other properties of the web.

I. Nonwoven Web

Various types of nonwoven webs may generally be fluorinated in accordance with the present invention. The nonwoven web may be a spunbond web, meltblown web, bonded carded web, airlaid web, coform web, hydraulically entangled web, and so forth. Polymers suitable for making nonwoven webs include, for example, polyolefins, polyesters, polyamides, polycarbonates, copolymers and blends thereof, etc. Most embodiments of the laminate of the present invention employ a nonwoven web formed from olefin-based polymers, which are non-polar in nature. Suitable polyolefins include polyethylene, such as high density polyethylene, medium density polyethylene, low density polyethylene, and linear low density polyethylene; polypropylene, such as isotactic polypropylene, atactic polypropylene, and syndiotactic polypropylene; polybutylene, such as poly(1-butene) and poly(2-butene); polypentene, such as poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. It should be noted that the polymer(s) may also contain other additives, such as processing aids or treatment compositions to impart desired properties to the fibers, residual amounts of solvents, pigments or colorants, and so forth.

If desired, the nonwoven web material used to form the elastic laminate may itself have a multi-layer structure. Suitable multi-layered materials may include, for instance, spunbond/meltblown/spunbond (SMS) laminates and spunbond/meltblown (SM) laminates. Various examples of suitable SMS laminates are described in U.S. Pat. Nos. 4,041,203 to Brock et al.; 5,213,881 to Timmons, et al.; 5,464,688 to Timmons, et al.; 4,374,888 to Bornslaeger; 5,169,706 to Collier, et al.; and 4,766,029 to Brock et al., which are incorporated herein in their entirety by reference thereto for all purposes. In addition, commercially available SMS laminates may be obtained from Kimberly-Clark Corporation under the designations Spunguard® and Evolution®.

Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above.

A nonwoven web material may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven fabric. Hydraulically entangled nonwoven fabrics of staple length and continuous fibers are disclosed, for example, in U.S. Pat. Nos. 3,494,821 to Evans and 4,144,370 to Boulton, which are incorporated herein in their entirety by reference thereto for all purposes. Hydraulically entangled composite nonwoven fabrics of a continuous fiber nonwoven web and a pulp layer are disclosed, for example, in U.S. Pat. Nos. 5,284,703 to Everhart, et al. and 6,315,864 to Anderson, et al., which are incorporated herein in their entirety by reference thereto for all purposes. The fibrous component of the composite may contain any desired amount of the resulting substrate. The fibrous component may contain greater than about 50% by weight of the composite, and in some embodiments, from about 60% to about 90% by weight of the composite. Likewise, the nonwoven web may contain less than about 50% by weight of the composite, and in some embodiments, from about 10% to about 40% by weight of the composite.

Although not required, the nonwoven web may also be necked before or after lamination to the elastic layer.

II. Fluorination

In accordance with the present invention, the nonwoven web is fluorinated to improve its ability to bond to the elastic layer. For example, a spunbond web can be exposed to elemental fluorine to fluorinate the web. In some embodiments, exposing one side of the web to elemental fluorine can effectively fluorinate fibers throughout the thickness of the web. Fluorination of the web results in a permanently modified web.

Without intending to be limited by theory, it is believed that the presence of fluorine atoms may increase the polarity of an otherwise non-polar nonwoven web and thus improve its compatibility with the polar materials of the elastic layer. An increase in polarity of the nonwoven web may be represented by a corresponding increase in surface tension, such as about 50% or more, in some embodiments about 75% or more, and in some embodiments, about 100% or more than the original surface tension of the nonwoven web. Fluorinated nonwoven webs may, for example, have a surface tension of greater than about 40, such as from about 45 to about 75 dynes per centimeter, and in some embodiments, from about 60 to about 75, under ambient conditions. In one particular embodiment, a spunbond polypropylene web having a surface tension of about 35 dynes per centimeter under ambient conditions is fluorinated so that the surface tension increases to about 72 dynes per centimeter. Still other advantages of fluorination may include, but are not limited to, improved abrasion resistance, increased adhesion to substrates, improved tear resistance, increased tensile strength, lowered flammability, improved UV resistance, and increased barrier properties.

Fluorination of the nonwoven web generally involves modifying the surface of the web to contain fluorine atoms by exposing it to a gaseous atmosphere that includes a fluorine-containing species, such as molecules and moieties containing fluorine atoms including, e.g., fluorine atoms, elemental fluorine, and fluorine-containing radicals. The fluorine-containing species may be derived from fluorinated compounds that are gases at room temperature, become gases when heated, or are capable of being vaporized. Examples of useful sources of fluorine-containing species include, fluorine atoms, elemental fluorine, fluorocarbons (e.g., $C_5F_{12}$, $C_2F_6$, $CF_4$, and hexafluoropropylene), hydrofluorocarbons (e.g., $CF_3H$), fluorinated sulfur (e.g., $SF_6$), fluorinated nitrogen (e.g., $NF_3$), fluorochemicals (e.g., $CF_3OCF_3$), and so forth. Other suitable fluorine-containing species may be described in U.S. Application Publication No. 2004/0207125 to Jones, et al., which is incorporated herein in its entirety by reference thereto for all purposes. Modification of the surface with other halogen family elements, such as chlorine and bromine, may also provide improved bonding and other characteristics.

Fluorination may be performed at atmospheric pressure or under reduced pressure. Although not required, fluorination is typically performed in a controlled atmosphere to prevent contaminants from interfering with the addition of fluorine atoms to the surface of the article. If desired, the atmosphere of the fluorine-containing species may include an inert diluent gas such as, e.g., helium, argon, nitrogen, and combinations thereof. Another suitable fluorination process involves immersing the nonwoven web into a liquid that is inert with respect to elemental fluorine, and bubbling elemental fluorine gas through the liquid to produce a surface fluorinated web. Examples of useful liquids that are inert with respect to fluorine include perhalogenated liquids (e.g., perfluorinated liquids). The elemental fluorine containing gas that is bubbled through the liquid can include an inert gas such as, e.g., nitrogen, argon, helium, and combinations thereof. The surface modification can be done in a batch or continuous process.

In one embodiment, the atmosphere should be substantially free of oxygen and other contaminants. However, it should be understood that trace or residual amounts of oxygen may be present in the actual fluorination process. For example, the atmosphere preferably contains less than 0.1% oxygen.

In some embodiments, after the fluorination with elemental fluorine gas, a second gas can be introduced to the web to be reacted with the polymers of the web. For example, after or during fluorination, carbon dioxide or carbon monoxide can be introduced. In one embodiment, carbon dioxide can be a carrier gas for the elemental fluorine, such as described in U.S. Pat. No. 4,994,308, which is herein incorporated by reference. For instance, after fluorination of a polyolefin web, introduction of carbon dioxide can produce a carbonyl in the web.

When fluorinating a surface of the nonwoven web, the surface should be substantially free of any halogen scavengers. Typically, halogen scavengers are used to capture halogen remaining as a residue of the catalyst in polymer contained in the nonwoven web. However, halogen scavengers would scavenge the fluorine during the fluorination of the surface of the nonwoven web, instead of allowing the fluorine to bond to the polymers on the surface of the web. Thus, the present inventors have discovered that the nonwoven web should preferably be substantially free of halogen scavengers prior to the fluorination of the web. However, it should be understood that trace or residual amounts of halogen scavengers may be present in the nonwoven web. For example, the nonwoven web preferably contains less than about 0.01 weight % halogen scavengers, such as less than about 0.008 weight %. Examples of halogen scavengers include, but are not limited to, synthetic hydrocalcite, such as synthetic dihydrocalcite available from Mitsui Chemical Co. of Houston, Tex. under the trade designation DHT4A; and phosphite stabilizers, such as Irgafos 168 available from Ciba Specialty Chemicals of Terrytown, N.Y.

In those embodiments where the nonwoven web is necked, fluorination can be performed before or after necking the facings.

III. Second Layer

The second layer can be any layer that can be attached to the fluorinated nonwoven web. For instance, the second layer can be a nonwoven web, a woven web, a foam, a film, or combinations or laminates thereof.

In one embodiment, the second layer can comprise polar polymers that can have improved attachment to a fluorinated surface of a non-polar nonwoven web, when compared to the attachment of the polar second layer to the same non-polar nonwoven web without any fluorination. Examples of polar polymers include, but are not limited to, polymers containing carbonyls, carboxyls, amines, and the like. These polar groups can be incorporated into the backbone of the polymer or can be attached as pendant groups to the polymer.

a. Elastic Layers

In one particular embodiment, the laminate of the present invention generally contains an elastic layer attached to the fluorinated nonwoven web. Generally, the elastic layer contains an elastomeric polymer that is polar in nature. Some examples of such elastomeric polymers include, but are not limited to, elastomeric polyesters, elastomeric polyurethanes, elastomeric polyamides, and so forth.

For instance, suitable elastomeric polyurethanes are available from under the designation ESTANE® from Noveon, Inc. or MORTHANE® from Morton Thiokol Corporation. Other suitable polyurethanes for use in the present invention include, but are not limited to, polyester-based aromatic polyurethanes, polyester-based aliphatic polyurethanes, polyether-based aliphatic and aromatic polyurethanes, and blends and mixtures of these polyurethanes. Spandex is another example of suitable polyurethane-based elastomeric polymer. More particularly, spandex is a polyurethane in fiber form containing a thermoplastic polyurethane elastomer alternating with polyethylene glycol segments. Commercial examples of spandex include LYCRA®, VYRENE®, DORLASTAN®, SPANZELLE® and GLOSPAN®. Suitable polyester elastic materials include, for example, copolyesters available under the trade designation HYTREL® from E.I. DuPont De Nemours & Company and copolyesters known as ARNITEL® available from DSM of Sittard, Holland.

In addition to polar elastomers, it should be understood that any other elastomer may also be used in the elastic layer. For example, the elastic layer may contain elastomeric polyolefins and/or elastomeric copolymers, which are generally non-polar in nature. Examples of elastomeric copolymers include block copolymers having the general formula A-B-A' or A-B, wherein A and A' are each a thermoplastic polymer endblock that contains a styrenic moiety and B is an elastomeric polymer midblock, such as a conjugated diene or a lower alkene polymer. Such copolymers may include, for instance, styrene-isoprene-styrene (S-I-S), styrene-butadiene-styrene (S-B-S), styrene-ethylene-butylene-styrene (S-EB-S), styrene-isoprene (S-I), styrene-butadiene (S-B), and so forth. Commercially available A-B-A' and A-B-A-B copolymers include several different S-EB-S formulations from Kraton Polymers of Houston, Tex. under the trade designation KRATON®. KRATON® block copolymers are available in several different formulations, a number of which are identified in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S elastomeric copolymers available from Kuraray Company, Ltd. of Okayama, Japan, under the trade designation SEPTON®. Still other suitable copolymers include the S-I-S and S-B-S elastomeric copolymers available from Dexco Polymers of Houston, Tex. under the trade designation VECTOR®. Also suitable are polymers composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer.

Examples of elastomeric polyolefins include ultra-low density elastomeric polypropylenes and polyethylenes, such as those produced by "single-site" or "metallocene" catalysis methods. Such elastomeric olefin polymers are commercially available from ExxonMobil Chemical Co. of Houston, Tex. under the trade designations ACHIEVE® (propylene-based), EXACT® (ethylene-based), and EXCEED® (ethylene-based). Elastomeric olefin polymers are also commercially available from DuPont Dow Elastomers, LLC (a joint venture between DuPont and the Dow Chemical Co.) under the trade designation ENGAGE® (ethylene-based) and from Dow Chemical Co. of Midland, Mich. under the name AFFINITY® (ethylene-based). Examples of such polymers are also described in U.S. Pat. Nos. 5,278,272 and 5,272,236 to Lai, et al., which are incorporated herein in their entirety by reference thereto for all purposes. Also useful are certain elastomeric polypropylenes, such as described in U.S. Pat. Nos. 5,539,056 to Yang, et al. and 5,596,052 to Resconi, et al., which are incorporated herein in their entirety by reference thereto for all purposes.

Regardless of the particular elastomers selected, the elastic layer of the laminate may generally have any desired form, such as a nonwoven web, film, foam, strands/filaments, etc. In one embodiment, for example, the elastic layer may be a film formed by any of a number of conventionally known processes, including flat die extrusion, blown film (tubular) process, casting, etc. The film may be mono- or multilayered. Multilayered films, for instance, may be prepared by co-extrusion of the layers, extrusion coating, or by any conventional layering process. The viscosity of the polymers selected to form the film may generally vary depending on the selected film-forming process. Viscosity is often gauged by the melt flow rate of a polymer, which is determined using well-known techniques as described in ASTM D 1238. Specifically, melt flow rate is inversely related to viscosity, and thus increases as viscosity decreases. In most embodiments of the present invention, for instance, the melt flow rate of the elastomeric polymers is greater than about 1.0 gram per 10 minutes (g/10 min). For example, when extruded as a cast film, lower viscosity elastomeric polymers are typically desired, such as those having a melt flow rate of greater than about 5.0 g/10 min. Likewise, when formed as a blown film, higher viscosity elastomeric polymers are typically desired, such as those having a melt flow rate of less than about 5.0 g/10 min.

Elastic films may be "liquid-and vapor-impermeable" and thus act as a barrier to the passage of liquids, vapors, and gases. In some embodiments of the present invention, it is also desired that the elastic film layer is "breathable" to allow the passage of water vapor and/or gases, which may provide increased comfort to a wearer by reducing excessive skin hydration and providing a cooler feeling. For example, the thermoplastic elastic material may be a breathable monolithic film that acts as a barrier to the passage of aqueous liquids, yet allows the passage of water vapor and air or other gases. Monolithic films are non-porous and have passages with cross-sectional sizes on a molecular scale formed by a polymerization process. The passages serve as conduits by which water molecules (or other liquid molecules) may disseminate through the film. Vapor transmission occurs through a monolithic film as a result of a concentration gradient across the monolithic film. As water (or other liquid) evaporates on the body side of the film, the concentration of water vapor increases. The water vapor condenses and dissolves on the surface of the body side of the film. As a liquid, the water molecules dissolve into the film. The water molecules then diffuse through the monolithic film and re-evaporate into the air on the side having a lower water vapor concentration. Monolithic breathable films are generally formed from polymers that inherently have good water vapor transmission or diffusion rates, such as polyurethanes, polyether esters, polyether amides, EMA, EEA, EVA, and so forth. Suitable examples of elastic breathable monolithic films are described in U.S. Pat. No. 6,245,401 to Ying, et al., which is incorporated herein in its entirety by reference thereto for all purposes. Monolithic films include poly-ethylenes (such as low density polyethylene), ethylene methyl acrylate copolymers, and ethylene vinyl acetate copolymers. One type of monolithic film comprises a copolyester thermoplastic elastomer such as a copolyetherester elastomer having a randomized hard-soft segment structure which is permeable to polar molecules such as water but is resistant to penetration by non-polar hydrocarbons such as refrigerant gases.

For instance, a monolithic film may comprise thermoplastic polyurethane elastomers, which are basically diisocynates and short chain diols (forming the basis of the hard segments) and long chain diols (forming the basis of the soft segments). Because the hard and soft segments are incompatible, the thermoplastic polyurethane elastomers exhibit two-phase structures, which in turn cause the formation of domain microstructures. Another type of monolithic film is a polyamide thermoplastic elastomer comprising hard and soft segments joined by amide linkages. These thermoplastic polyamide elastomers exhibit properties that are dependent upon the chemical composition of the hard (polyamide) and the soft (polyether, polyester, or polyetherester) segments as well as the length of the segments. Still another type of monolithic film is a polymer/polymer composite combining polydimethyl siloxane and polytetrafluoroethylene in an interpenetrating polymer network that forms film having a physical blend of the two polymers rather than a copolymer or a new compound.

Microporous elastic films may also be used. The micropores form what is often referred to as tortuous pathways through the film. Liquid contacting one side of the film does not have a direct passage through the film. Instead, a network of microporous channels in the film prevents liquids from passing, but allows gases and water vapor to pass. Microporous films may be formed from a polymer and a filler. Fillers are particulates or other forms of material that may be added to the film polymer extrusion blend and that will not chemically interfere with the extruded film, but which may be uniformly dispersed throughout the film. Generally, the fillers have a spherical or non-spherical shape with average particle sizes in the range of from about 0.1 to about 7 microns. Examples of suitable fillers include, but are not limited to, calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives. A suitable coating, such as stearic acid, may also be applied to the filler particles if desired. The films are made breathable by stretching the filled films to create the microporous passageways as the polymer breaks away from the calcium carbonate during stretching. For example, the breathable material contains a stretch-thinned film that includes at least two basic components, i.e., a polyolefin polymer and filler. These components are mixed together, heated, and then cast into a film. Stretching of the film may be accomplished, for instance, using a machine direction orienter, such as described below.

Breathable microporous elastic films containing fillers are described, for example, in U.S. Pat. Nos. 6,015,764 and 6,111,163 to McCormack, et al.; 5,932,497 to Morman, et al.; 6,461,457 to Taylor, et al., which are incorporated herein in their entirety by reference thereto for all purposes. Other breathable films having bonding agents are disclosed in U.S. Pat. Nos. 5,855,999 and 5,695,868 to McCormack, which are incorporated herein in their entirety by reference thereto for all purposes. In addition, exemplary multilayer breathable films are disclosed in U.S. Pat. No. 5,997,981 to McCormack et al., which is incorporated herein in its entirety by reference thereto for all purposes.

In yet another embodiment of the invention, a cellular elastic film may be used to provide breathability. Breathable cellular elastic films may be produced by mixing the elastomeric polymer resin with a cell-opening agent that decomposes or reacts to release a gas to form cells in the elastic film. The cell opening agent may be an azodicarbonamide, fluorocarbon, low boiling point solvent (e.g., methylene chloride, water, etc.) and other cell-opening or blowing agents known in the art to create a vapor at the temperature experienced in the film die extrusion process. Exemplary cellular elastic films are described in WO 00/39201 to Thomas et al., which is incorporated herein in its entirety by reference thereto for all purposes.

Breathability may also be imparted to the laminate without concern for its barrier properties. In such circumstances, either the elastic film itself or the entire elastic laminate may be apertured or perforated to provide a laminate capable of allowing the passage of vapors or gases. Such perforations or apertures may be performed by methods known in the art, such as slit aperturing or pin aperturing with heated or ambient temperature pins.

IV. Lamination

Generally speaking, the fluorinated nonwoven web may be laminated to the elastic layer using any technique known in the art. In one particular embodiment, for example, known techniques are used to form a nonwoven/film laminate, such as a continuous filament stretch bonded laminate (CFSBL), vertical filament laminate (VFL), neck-bonded-laminate (NBL), a stretch-bonded-laminate (SBL), a necked-stretch bonded laminate (NSBL) or a necked-thermal laminate, etc. Exemplary CFSBL, NBL, SBL, and NSBL materials are described in U.S. Pat. Nos. 5,226,992, 4,981,747, 4,965,122, 5,336,545, 5,385,775, 5,414,470, 4,720,415, 4,789,699, 4,781,966, 4,657,802, 4,652,487, 4,655,760, 5,116,662 and 5,114,781, and 6,323,389, all of which are incorporated herein in their entirety by reference thereto for all purposes.

Exemplary VFL materials are described in U.S. Patent Application Publication No. 2002/0104608 to Welch, et al., which is incorporated herein in its entirety by reference thereto for all purposes.

Referring to FIG. 1, for instance, one method for forming a laminate from an elastic film and a fluorinated nonwoven web material is shown. It should be understood that this embodiment is discussed for exemplary purposes only, and that any other lamination technique may generally be used in the present invention. Initially, the raw materials (e.g., polymers) for the elastic film are compounded through a method well known to those skilled in the art. For instance, the raw materials may be dry mixed together and added to a hopper of an extruder. In the hopper, the materials are dispersively mixed in the melt and conveyed by the action of an intermeshing rotating screw. Thereafter, the extruded material is immediately chilled and cut into pellet form. As stated above, any known technique may then be used to form a film from the compounded material, including blowing, casting, flat die extruding, etc. For example, in the particular embodiment of FIG. 1, the compounded material (not shown) is supplied to an extrusion apparatus 80 and then cast onto a casting roll 90 to form a single-layered precursor film 10*a*. If a multilayered film is to be produced, the multiple layers are co-extruded together onto the casting roll 90. The casting roll 90 may optionally be provided with embossing elements to impart a pattern to the film. Typically, the casting roll 90 is kept at temperature sufficient to solidify and quench the sheet 10*a* as it is formed, such as from about 20 to 60° C. If desired, a vacuum box may be positioned adjacent to the casting roll 90 to help keep the precursor film 10*a* close to the surface of the roll 90. Additionally, air knives or electrostatic pinners may help force the precursor film 10*a* against the surface of the casting roll 90 as it moves around a spinning roll. An air knife is a device known in the art that focuses a stream of air at a very high flow rate to pin the edges of the film.

Once cast, the elastic film 10*a* may then be oriented in one or more directions to further improve film uniformity and reduce thickness. Orientation may also form micropores in a film containing a filler, thus providing breathability to the film. One benefit of the present invention is that the film may be oriented in-line, without having to remove the film for separate processing. For example, the film may be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" oriented film may then be laminated to a fibrous web. In addition, the uniaxially oriented film may also be oriented in the cross-machine direction to form a "biaxially oriented" film. For example, the film may be clamped at its lateral edges by chain clips and conveyed into a tenter oven. In the tenter oven, the film may be reheated and drawn in the cross-machine direction to the desired draw ratio by chain clips diverged in their forward travel.

Referring again to FIG. 1, for instance, one method for forming a uniaxially oriented film is shown. As illustrated, the precursor film 10*a* is directed to a film-orientation unit 100 or machine direction orienter ("MDO"), such as commercially available from Marshall and Willams, Co. of Providence, R.I. The MDO has a plurality of stretching rolls (such as from 5 to 8) which progressively stretch and thin the film in the machine direction, which is the direction of travel of the film through the process as shown in FIG. 1. While the MDO 100 is illustrated with eight rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 100 may act as preheat rolls. If present, these first few rolls heat the film 10*a* above room temperature (e.g., to 125° F.). The progressively faster speeds of adjacent rolls in the MDO act to stretch the film 10*a*. The rate at which the stretch rolls rotate determines the amount of stretch in the film and final film weight.

A fluorinated nonwoven web is also employed for laminating to the oriented film 10*b*. For example, as shown in FIG. 1, the fluorinated nonwoven web 50 may simply be unwound from a supply roll 54. The fluorinated nonwoven web may optionally be supplied in a necked condition. Alternatively, a nonwoven web may be formed and fluorinated in-line (not shown).

As shown in FIG. 1, the fluorinated surface 52 of the fluorinated nonwoven web 50 is provided in a suitable position to be laminated with film 10*b*. The fluorinated nonwoven web 50 is directed to a nip defined between rolls 58 for laminating to the film 10*b* to fluorinated surface 52 of fluorinated nonwoven web 50. Although not specifically illustrated, the fluorinated nonwoven web 50 may also be necked in-line prior to lamination.

In accordance with certain embodiments of the present invention, the fluorinated nonwoven web 50 may then be bonded to the film 10*b* using a variety of techniques. Due to the improved compatibility imparted by surface fluorination, for example, the elastic film 10*b* may be directly laminated to the nonwoven web 50 without the need for an adhesive. Specifically, the fluorinated surface 52 of the nonwoven web 50 may simply be pressed against the elastic film 10*b* to provide the desired level of attachment. Heat may optionally be provided to facilitate lamination. Although the present invention is capable of providing the desired level of lamination without an adhesive, various embodiments of the present invention nevertheless contemplate the use of an adhesive. For example, an adhesive that would otherwise result in delamination may function effectively as a result of fluorination in accordance with the present invention. In this regard, FIG. 1 illustrates an optional adhesive bonding system 32 that may be used in the present invention. Examples of adhesives that may be used in the present invention include Rextac 2730 and 2723 available from Huntsman Polymers of Houston, Tex., as well as adhesives available from Bostik Findley, Inc, of Wauwatosa, Wis. The basis weight of the adhesive may be from about 1.0 and 3.0 gsm. The type and basis weight of the adhesive used will be determined on the elastic attributes desired in the final laminate and end use. Although not required, the adhesive may be applied directly to the nonwoven web prior to lamination with the film. Further, to achieve improve drape, the adhesive may be applied in a pattern. Of course, in addition to adhesion bonding, other known bonding techniques may also be employed in the present invention, such as thermal bonding, ultrasonic bonding, microwave bonding, extrusion coating, and so forth.

After the fluorinated nonwoven web 50 and the film 10*b* are laminated together, the resulting laminate 40 is optionally subjected to additional treatments. In one embodiment, for example, the laminate 40 is mechanically stretched in the cross-machine and/or machine directions to enhance extensibility. For instance, the laminate may be coursed through two or more rolls that have grooves in the CD and/or MD directions. The grooved rolls may be constructed of steel or other hard material (such as a hard rubber). In the embodiment shown in FIG. 1, for instance, the laminate 40 is mechanically stretched in the cross-machine direction using a series of four satellite rolls 82 that each engage an anvil roll 84. Specifically, the laminate 40 is passed through a nip formed between each satellite roll 82 and the anvil roll 84 so that the laminate 40 is mechanically (incrementally) stretched in a cross-machine direction. The laminate 40 is typically stretched in one or more directions from about 1.5× to about 8×, in some embodiments by at least about 2× to about 6×, and in some embodiments, from about 2.5× to about 4.5×. If desired, heat may be applied to the laminate 40 just prior to or during the application of incremental stretch to cause it to relax somewhat and ease extension. Heat may be applied by any suitable method known in the art, such as heated air, infrared heaters, heated nipped rolls, or partial wrapping of the laminate around one or more heated rolls or steam canisters, etc. Heat may also be applied to the grooved rolls themselves. Grooved satellite/anvil roll arrangements, such as described above, are also discussed in more detail in PCT Publication No. WO 04/020174 to Gerndt, et al., which is incorporated herein in its entirety by reference thereto for all purposes. It should also be understood that other grooved roll arrangement are equally suitable, such as two grooved rolls positioned immediately adjacent to one another.

Besides the above-described grooved rolls, other techniques may also be used to mechanically stretch the laminate 40 in one or more directions. For example, the laminate 40 may be passed through a tenter frame that stretches the laminate 40. Such tenter frames are well known in the art and described, for instance, in U.S. Patent Application Publication No. 2004/0121687 to Morman, et al. The laminate 40 may also be necked. Suitable techniques necking techniques are described in U.S. Pat. Nos. 5,336,545, 5,226,992, 4,981, 747 and 4,965,122 to Morman, as well as U.S. Patent Application Publication No. 2004/0121687 to Morman, et al., all of which are incorporated herein in their entirety by reference thereto for all purposes.

Referring again to FIG. 1, the mechanically-stretched laminate 40 may then contact anneal rolls 57, which are heated to an annealing temperature (e.g., 35 to 60° C.) for the film. After annealing, another roll may also be employed that cools the film (e.g., to 10 to 30° C.) to set the final stretch properties. Thereafter, the laminate 40 may be wound up onto a take-up roll 60. Optionally, the laminate 40 may be allowed to slightly retract prior to winding on to a take-up roll 60. This may be achieved by using a slower linear velocity for the roll 60. Alternatively, a machine direction drawing tension may be applied to retract the laminate 40. In any event, if the elastic film 10b is tensioned prior to lamination, it will retract toward its original machine direction length and become shorter in the machine direction, thereby buckling or forming gathers in the laminate. The resulting elastic laminate 40 thus becomes extensible in the machine direction to the extent that the gathers or buckles in the web 50 may be pulled back out flat and allow the elastic film 10b to elongate.

In the embodiment described above, the lamination of the fluorinated nonwoven web 50 to the film 10b results in a bi-laminate or bilayer material having CD and/or MD extensibility. In another embodiment of the present invention, a tri-laminate or trilayer material may also be formed that contains a nonwoven web on each side of the elastic film. Referring again to FIG. 1, for example, a second nonwoven web (not shown), which is optionally fluorinated, may be directed to the lamination nip to contact the side surface of the film 10b opposite the side to which the first fluorinated nonwoven web 50 was laminated. The second nonwoven web may or may not be extensible in one or more directions.

While not shown here, various additional potential processing and/or finishing steps known in the art, such as slitting, treating, aperturing, printing graphics, or further lamination of the elastic laminate into a composite with other materials, such as other films or other nonwoven layers, may be performed without departing from the spirit and scope of the invention. In addition, the elastic laminates formed by the method of the present invention are highly suited for use in medical care products, wipers, protective wear garments, mortuary and veterinary products, and personal care products. Examples of such products include, but are not limited to, medical and health care products such as surgical drapes, gowns and bandages, protective workwear garments such as coveralls and lab coats, and infant, child and adult personal care absorbent articles, such as diapers, training pants, incontinence garments and pads, sanitary napkins, wipes, and so forth. In one particular embodiment, for example, the elastic laminate is used in the construction of an absorbent article. For example, a breathable film may be laminated to a fluorinated nonwoven web to form an outer cover of an absorbent article. The elastic laminate may likewise be used in various components of the absorbent article, such as side barriers, elastomeric diaper ears, waist bands and other components of disposable, absorbent products.

Generally, the laminates of the present invention can have improved peel strength than a laminate made without fluorination of the nonwoven web. Additionally, the laminates of the present invention can have high peel strength without the Use of an adhesive. For example, the laminates of the present invention can have an increased peel strength of at least about 50% than the identical laminate without fluorination, such as at least about 75%. In one particular embodiment, the peel strength of the laminate can exceed the actual strength of the laminated sheets such that when the peel strength test is performed, the laminate tears completely, prior to delamination of the layers.

In peel or delamination testing a laminate is tested for the amount of tensile force which will pull the layers of the laminate apart. Values for peel strength are obtained using a specified width of fabric, clamp jaw width and a constant rate of extension. For samples having a film side, the film side of the specimen is covered with masking tape or some other suitable material in order to prevent the film from ripping apart during the test. The masking tape is on only one side of the laminate and so does not contribute to the peel strength of the sample. This test uses two clamps, each having two jaws with each jaw having a facing in contact with the sample, to hold the material in the same plane, usually vertically, separated by 2 inches to start. The sample size is 4 inches wide by as much length as necessary to delaminate enough sample length. The jaw facing size is 1 inch high by at least 4 inches wide, and the constant rate of extension is 300 mm/min. The sample is delaminated by hand a sufficient amount to allow it to be clamped into position and the clamps move apart at the specified rate of extension to pull the laminate apart. The sample specimen is pulled apart at 180° of separation between the two layers and the peel strength reported as an average of peak load in grams. Measurement of the force is begun when 16 mm of the laminate has been pulled apart and continues until a total of 170 mm has been delaminated. The Sintech 2 tester, available from the Sintech Corporation, 1001 Sheldon Dr., Cary, N.C. 27513, the Instron Model TM, available from the Instron Corporation, 2500 Washington St., Canton, Mass. 02021, or the Thwing-Albert Model INTELLECT II available from the Thwing-Albert Instrument Co., 10960

Dutton Rd., Phila., PA 19154, may be used for this test. Results are reported as an average of three specimens and may be performed with the specimen in the cross direction (CD) or the machine direction (MD).

According to this test method, for example, the peel strength of a fluorinated spunbond nonwoven web of polypropylene fibers directly attached to a polyurethane film according to the process of FIG. 1 is higher than the strength of the laminate itself, i.e., attempts to peel the layers apart resulted in cohesive failure of the laminate.

The present invention may be better understood with reference to the following example.

EXAMPLE

A polypropylene spunbond nonwoven web, which was substantially free of halogen scavengers, was tested in accordance with the following. The polypropylene spunbond nonwoven web had an initial surface tension of about 36 dynes/cm, as measured using a set of dyne standard solutions, which correspond to the surface tension. To determine the surface tension of the web, the web is laid flat and a dyne solution is applied to the surface of the web. If the dyne solution beads on the web, then it has not wetted out. Once the dyne solution wet the web (and does not bead), then the surface tension is known, according to the particular dyne solution that wetted out the web.

The polypropylene spunbond nonwoven web was fluorinated with elemental fluorine by Fluoro-seal International, L.P. of Houston, Tex. The fluorinated polypropylene spunbond nonwoven web had a surface tension of about 72 dynes/cm.

A thermoplastic polyurethane, such as those sold by NOVEON, was extrusion cast (as shown the embodiment described in FIG. 1) and laminated, without the use of an adhesive, to both a control polypropylene spunbond nonwoven web and a fluorinated polypropylene spunbond nonwoven web.

The thermoplastic polyurethane film did not stick to and was easily peeled off of the control polypropylene spunbond nonwoven web, indicating that little attachment occurred.

However, the thermoplastic polyurethane film bonded intimately to the fluorinated polypropylene spunbond nonwoven web. Attempts to delaminate the composite web were unsuccessful, indicating that strong attachment was achieved.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A method of making a composite web, comprising
providing a nonwoven web defining a surface that has an original surface tension, wherein the nonwoven web comprises a nonpolar polymeric material;
fluorinating the surface of the nonwoven web to increase the original surface tension by at least about 50%, wherein fluorination of the surface of the nonwoven web bonds fluorine atoms to the nonpolar polymeric material;
attaching an elastic layer to the fluorinated surface of the nonwoven web, wherein the elastic layer is directly laminated to the fluorinated surface of the nonwoven web.

2. A method as in claim 1, wherein the surface of the nonwoven web is fluorinated by a reaction of elemental fluorine with the surface of the nonwoven web.

3. A method as in claim 1, wherein the elastic layer is an elastic film.

4. A method as in claim 3, wherein the elastic film is breathable.

5. A method as in claim 1, wherein the elastic layer is directly laminated to the fluorinated surface of the nonwoven web without the use of an adhesive.

6. A method as in claim 1, wherein the nonpolar polymeric material comprises olefin-based polymers.

7. A method as in claim 1, wherein the nonwoven web comprises a spunbond polypropylene web.

8. A method as in claim 1, wherein the nonwoven web is substantially free of halogen scavengers.

9. A method as in claim 1, wherein the fluorinated surface of the nonwoven web has a surface tension of greater than about 40 dynes per centimeter.

10. A method as in claim 1, wherein the fluorinated surface of the nonwoven web has a surface tension from about 45 dynes per centimeter to about 75 dynes per centimeter.

11. A method as in claim 1, wherein fluorination of the surface of the nonwoven web is performed in an atmosphere that is substantially free of oxygen.

12. A method as in claim 1, wherein the elastic layer comprises an elastomeric polymer that is polar in nature.

13. A method as in claim 12, wherein the elastomeric polymer comprises an elastomeric polyurethane.

14. A method as in claim 12, wherein the elastomeric polymer comprises an elastomeric polyester.

15. A method as in claim 12, wherein the elastomeric polymer comprises an elastomeric polyamide.

* * * * *